No. 778,778. PATENTED DEC. 27, 1904.
A. G. GLASGOW.
WATER GAS GENERATOR.
APPLICATION FILED AUG. 20, 1903.

3 SHEETS—SHEET 2.

No. 778,778. PATENTED DEC. 27, 1904.
A. G. GLASGOW.
WATER GAS GENERATOR.
APPLICATION FILED AUG. 20, 1903.

3 SHEETS—SHEET 3.

No. 778,778. Patented December 27, 1904.

UNITED STATES PATENT OFFICE.

ARTHUR GRAHAM GLASGOW, OF WESTMINSTER, ENGLAND, ASSIGNOR TO THE UNITED GAS IMPROVEMENT COMPANY, OF PHILADELPHIA, PENNSYLVANIA.

WATER-GAS GENERATOR.

SPECIFICATION forming part of Letters Patent No. 778,778, dated December 27, 1904.

Application filed August 20, 1903. Serial No. 170,183.

*To all whom it may concern:*

Be it known that I, ARTHUR GRAHAM GLASGOW, a citizen of the United States of America, residing at Westminster, England, have invented Improvements in Water-Gas-Generating Apparatus, of which the following is a specification.

According to this invention, in order to prevent the dust and "fliers" contained in gases issuing from the generator of water-gas apparatus from entering connected vessels—for instance, carbureting or regenerating chambers—the conduit leading from the generator to the connected vessel is provided with a dust-intercepter, as described. This intercepter comprises a dust-chamber placed at the end of and communicating with the outlet-conduit from the generator, which conduit is provided with a branch leading to the connected vessel, the arrangement being such that the gases issuing from the generator and carrying dust and fliers travel toward the dust-chamber, and the dust and fliers, by reason of their greater momentum, will continue to travel in the same direction and will enter and be caught in the dust-chamber, while the gases turn into the branch leading to the connected vessel. In water-gas apparatus provided with this dust-intercepting arrangement in the outlet from the generator the flow of gas from the top or bottom of the generator may be controlled according to requirement by means of a reversing-valve in a valve-chamber in which meet the conduits from the top and the bottom of the generator and to the carbureter or other connected vessel. The reversal of the valve also causes reversal of the steam-cock which controls the supply of steam to the top or bottom of the generator.

Figure 1:
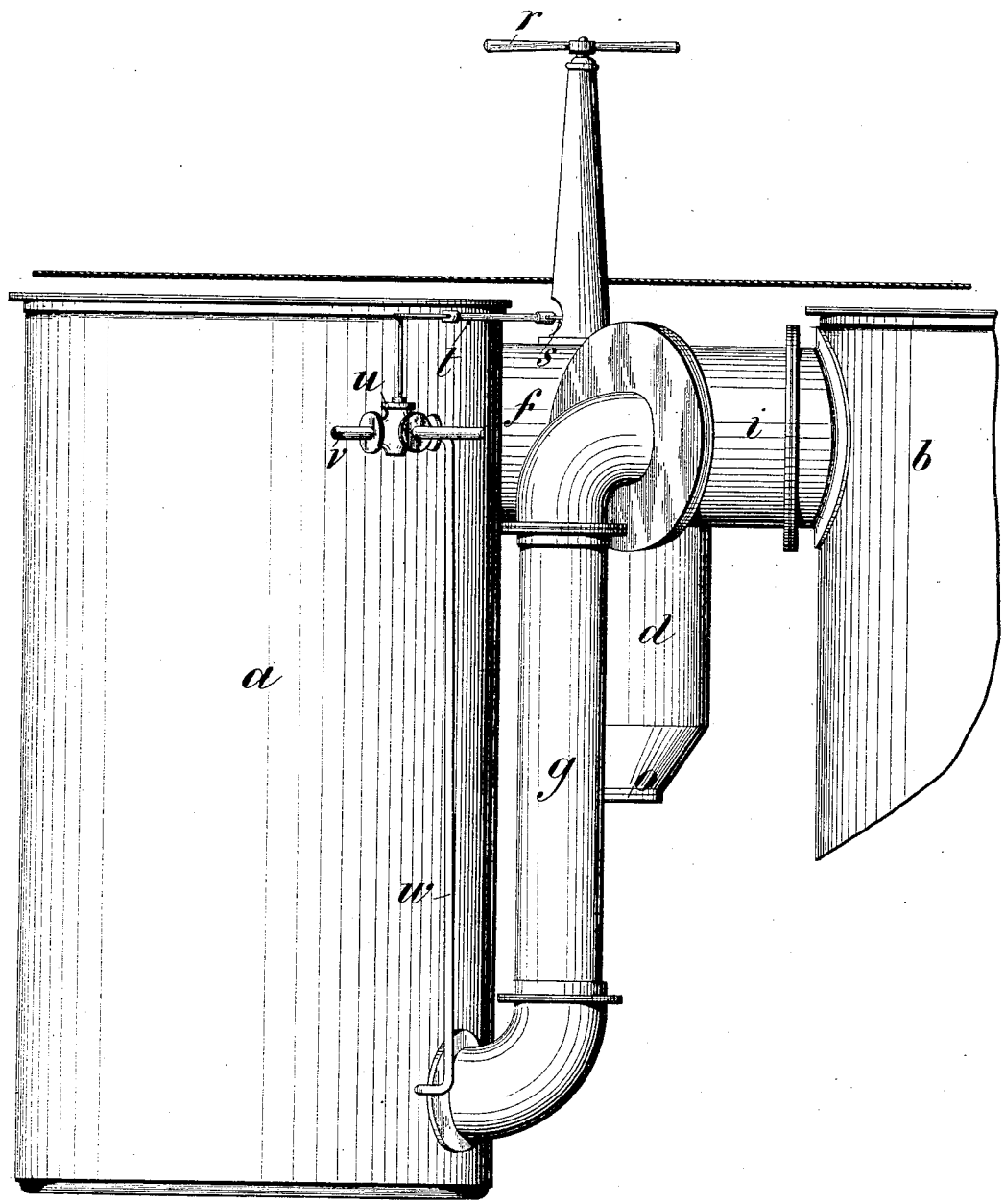
Figure 2:
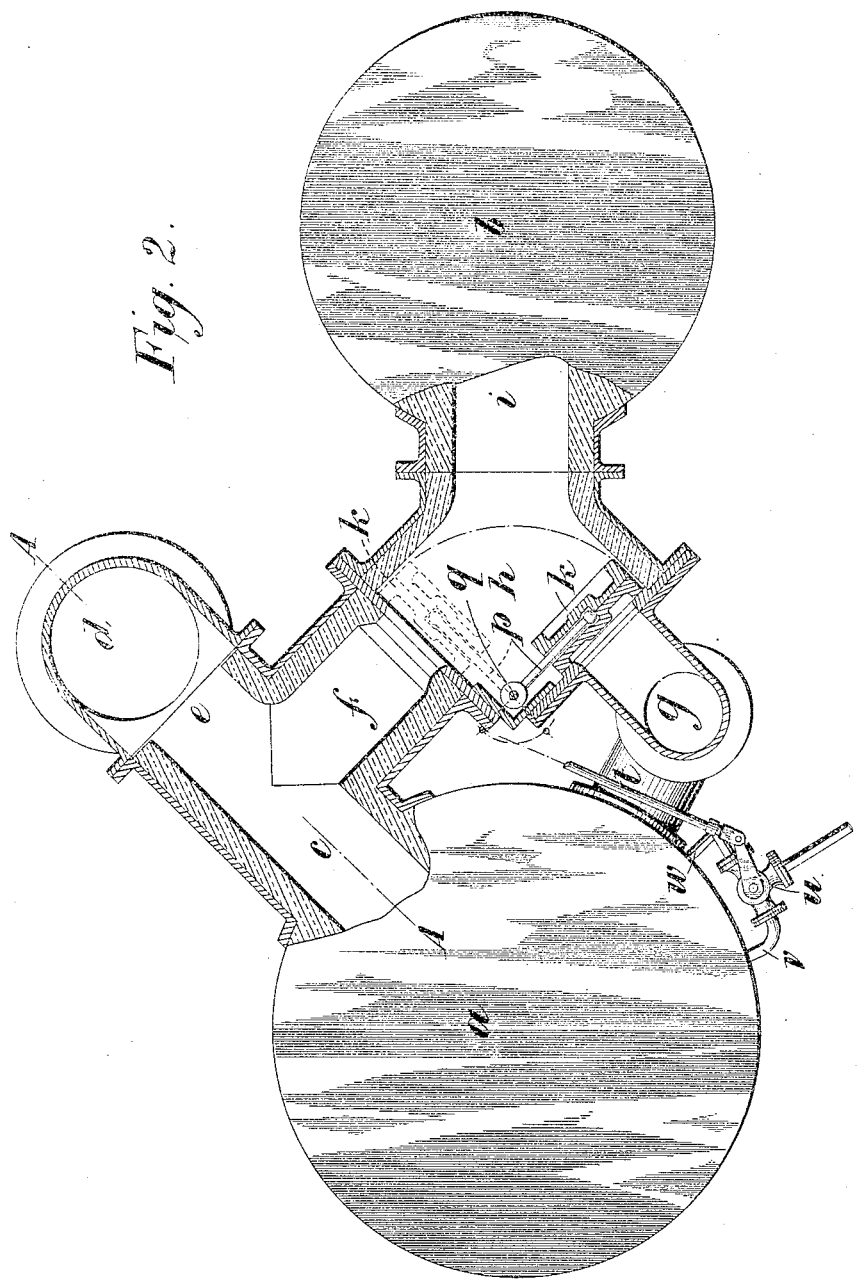
Figure 3:
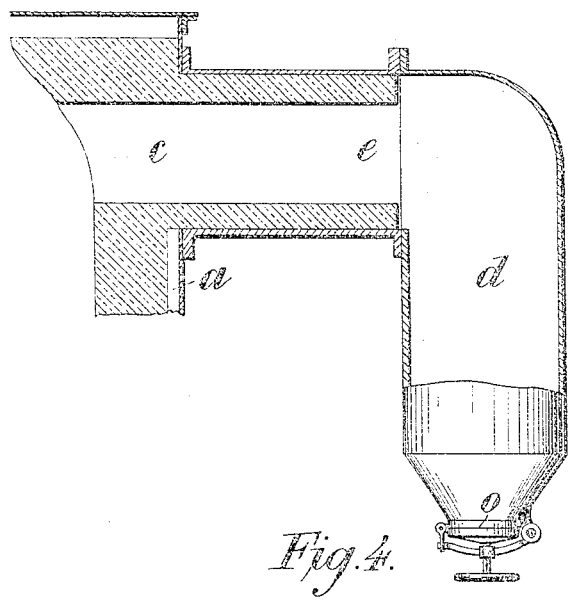
Figure 4:
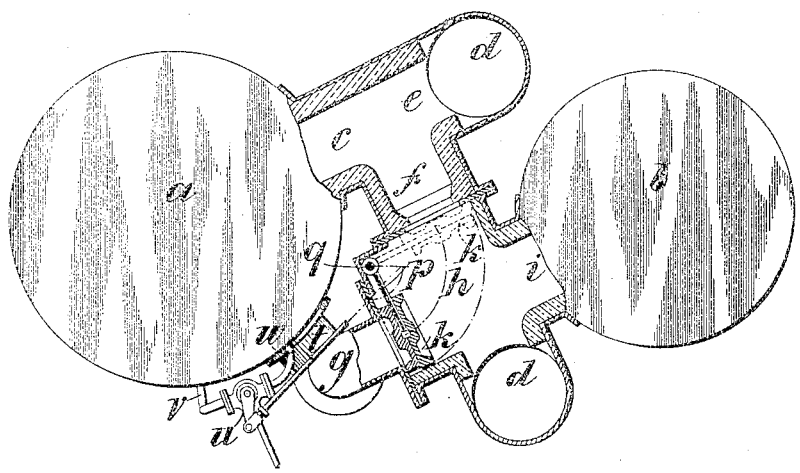

Referring to the drawings, Figure 1 shows in side elevation as much as is necessary of a water-gas-generating apparatus according to this invention. Fig. 2 is a sectional plan thereof; and Fig. 3 is a detail sectional elevation on the line A A, Fig. 2. Fig. 4 is a similar view to Fig. 2 of a modified arrangement.

$a$ is the generator; $b$, the carbureter; $c$, the conduit for leading the gas from the top of the generator; $d$, the dust-chamber communicating through the opening $e$ with the end of the conduit $c$; $f$, a lateral branch; $g$, the conduit for leading gas from the bottom of the generator $a$; $h$, the reversing-valve chamber; $i$, the conduit leading therefrom to the carbureter $b$; $k$, the reversing-valve. The dust-chamber $d$ is shown cylindrical and arranged vertically, the bottom portion tapering to an opening closed by a lid $o$ for the purpose of emptying chamber when necessary.

The intercepter may be placed between the reversing-valve and the carbureter or other connected vessel, and it will be often desirable to place one intercepter before the valve and another intercepter after the valve—for example, as shown in Fig. 4.

The reversing-valve $k$ may be carried on an arm $p$, projecting from a spindle or hinge-pin $q$, provided externally with an operating-lever $r$ and a suitable means of firmly holding valve against either seat. The spindle $q$, with a crank-arm $s$, connected by a link $t$ to the plug of a cock $u$, will control the supply of steam to the top or the bottom of the generator through pipes $v$ and $w$, respectively, according to the position of the reversing-valve $k$, the steam-cock and said valve being actuated by one operation.

What I claim is—

1. In water-gas-generating apparatus, the combination of a gas-generator, a vessel receiving gas therefrom, a dust-intercepter, a conduit leading from the generator and terminating at the intercepter, and a branch conduit leading from said conduit intermediate the generator and intercepter to the gas-receiving vessel, as set forth.

2. In water-gas-generating apparatus, the combination of a gas-generator, a vessel receiving gas therefrom, a dust-intercepter, a conduit leading from the generator terminating at the intercepter and a branch conduit leading from said conduit intermediate the generator and intercepter to the gas-receiving vessel, and a valve adapted to reverse the flow of gas through the generator, as set forth.

3. In water-gas-generating apparatus the combination of a gas-generator, a vessel receiving gas therefrom, a dust-intercepter, a conduit leading from the generator and terminating at the intercepter and a branch conduit leading from said conduit intermediate the generator and intercepter to the gas-receiving vessel, a valve adapted to reverse the flow of gas through the generator, means for reversing the supply of steam to the generator and means connecting said gas-reversing valve and steam-reversing means, as set forth.

4. In water-gas-generating apparatus, the combination of an upper conduit leading from the upper part of the generator and provided with a branch conduit, a dust-intercepter communicating with and arranged at the end of the upper conduit, a valve-chamber communicating with the branch conduit, a conduit from the lower part of the generator to said valve-chamber, and a gas-reversing valve adapted to close either the upper or lower conduit, as set forth.

5. In water-gas-generating apparatus, the combination of an upper conduit leading from the upper part of the generator, a dust-intercepter communicating with and arranged at the end of the upper conduit, a valve-chamber communicating with the branch conduit, a conduit from the lower part of the generator to said valve-chamber, a gas-reversing valve adapted to close either the upper or lower conduit, a device for reversing the supply of steam to the generator and means connecting said valve and device, as set forth.

6. The combination with a gas-generator and a vessel for receiving gas from the generator of a dust-chamber, a straight conduit from the generator terminating at the chamber, and a branch conduit extending from said vessel and communicating with the first-mentioned conduit intermediate of the generator and chamber, whereby entrained dust and "fliers" from the generator impinge upon the wall at the end of the first-mentioned conduit and fall and remain in the chamber.

Signed at London, England, this 7th day of May, 1903.

ARTHUR GRAHAM GLASGOW.

Witnesses:
H. D. JAMESON,
A. NUTTING.